United States Patent
Reddy A V et al.

(10) Patent No.: US 11,940,878 B2
(45) Date of Patent: Mar. 26, 2024

(54) UNINTERRUPTED BLOCK-BASED RESTORE OPERATION USING A READ-AHEAD BUFFER

(71) Applicant: EMC IP Holding Company LLC, Hopkinton, MA (US)

(72) Inventors: Mahesh Reddy A V, Bangalore (IN); Chetan Battal, Bangalore (IN); Mahantesh Ambaljeri, Bangalore (IN); Swaroop Shankar DH, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 542 days.

(21) Appl. No.: 16/789,744

(22) Filed: Feb. 13, 2020

(65) Prior Publication Data
US 2021/0255929 A1 Aug. 19, 2021

(51) Int. Cl.
*G06F 11/14* (2006.01)
*G06F 16/182* (2019.01)

(52) U.S. Cl.
CPC ........ *G06F 11/1448* (2013.01); *G06F 16/183* (2019.01); *G06F 2201/80* (2013.01)

(58) Field of Classification Search
CPC . G06F 11/1448; G06F 16/183; G06F 2201/80
See application file for complete search history.

(56) References Cited

U.S. PATENT DOCUMENTS

| 7,522,167 | B1* | 4/2009 | Diard | G06T 15/005 |
| | | | | 345/502 |
| 8,677,055 | B2* | 3/2014 | Ouye | G06F 16/23 |
| | | | | 711/103 |
| 2004/0078462 | A1* | 4/2004 | Philbrick | H04L 69/163 |
| | | | | 709/224 |
| 2005/0185472 | A1* | 8/2005 | Randell | G06F 12/1441 |
| | | | | 365/185.33 |
| 2013/0305087 | A1* | 11/2013 | Catthoor | G06F 11/1471 |
| | | | | 709/219 |
| 2013/0305099 | A1* | 11/2013 | Ionescu | G06F 11/348 |
| | | | | 714/45 |
| 2016/0224486 | A1* | 8/2016 | Ibrahim | G06F 13/1673 |
| 2017/0052736 | A1* | 2/2017 | Butt | G06F 3/0619 |

* cited by examiner

*Primary Examiner* — Mark D Featherstone
*Assistant Examiner* — Tony Wu
(74) *Attorney, Agent, or Firm* — WOMBLE BOND DICKINSON (US) LLP

(57) ABSTRACT

Methods and systems for restoring data are described. According to some embodiments, the method, in response to receiving a first restore request, initiates a second restore request to a hybrid data buffer to route blocks of backup data to the hybrid data buffer. The method further invokes an interrupt service routine (ISR) that is initialized with reserved addresses. When the blocks of backup data are transmitted to the hybrid data buffer, the method further tags, by the ISR, the blocks of backup data to a specified location, where the specified location is one of the reserved addresses.

18 Claims, 5 Drawing Sheets

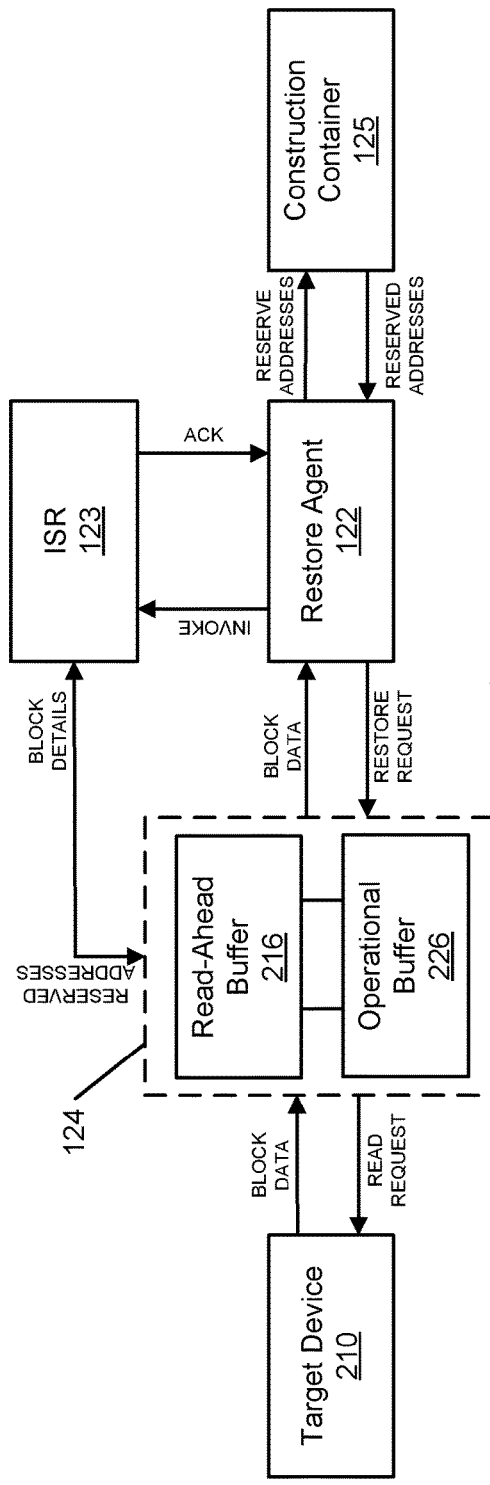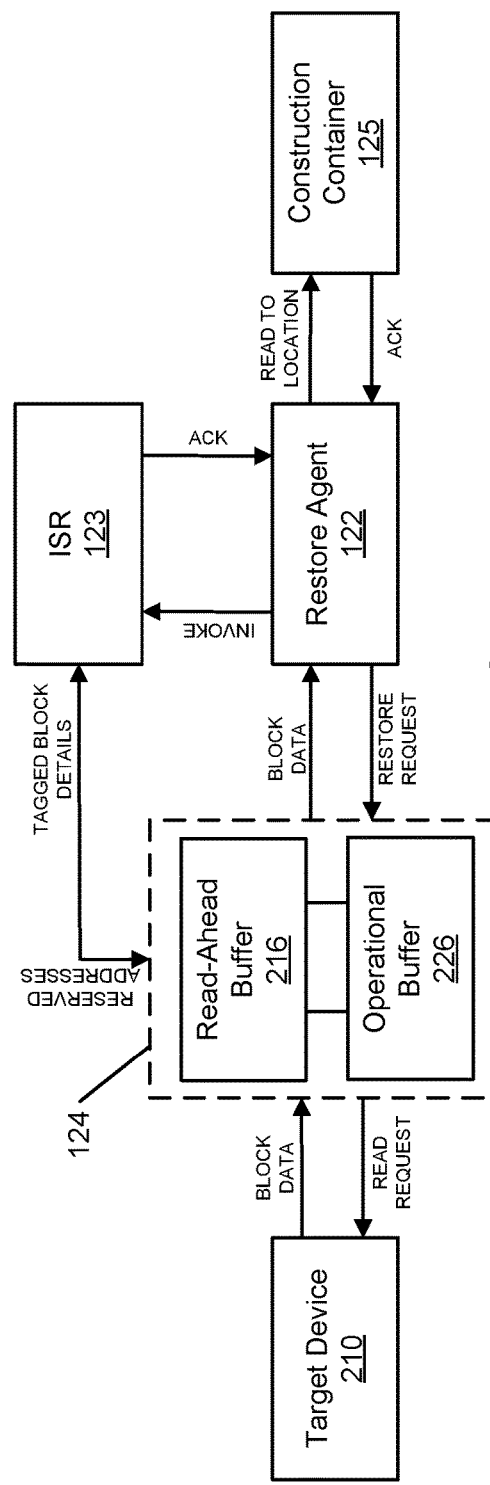

US 11,940,878 B2

UNINTERRUPTED BLOCK-BASED RESTORE OPERATION USING A READ-AHEAD BUFFER

FIELD OF THE INVENTION

Embodiments of the present invention relate generally to data storage systems. More particularly, embodiments of the invention relate to an uninterrupted block-based restore operation using a read-ahead buffer.

BACKGROUND

Unexpected events cause restore operations to abort in between, and the need to start successive restores from the point of interruption to avoid a restore window increase and corruption of production data has become vital nowadays. While the restore operation is in progress and due to some random unintended event, the restore operation would be abruptly aborted, thereby causing the data to be partially written back (e.g., half written back) to a target host. Also, the restore operation would be rolled back after this point in most cases, resulting in unusable data and corrupted production environment.

Unfortunately, such situation would lead to an increase of restore window. Additionally, the restore operation must be restarted from the beginning even though some portion of restore was already completed.

BRIEF DESCRIPTION OF THE DRAWINGS

Embodiments of the invention are illustrated by way of example and not limitation in the figures of the accompanying drawings in which like references indicate similar elements.

FIGS. 2A-2D are block diagrams illustrating a restore operation according to one embodiment.

DETAILED DESCRIPTION

Figure 1:
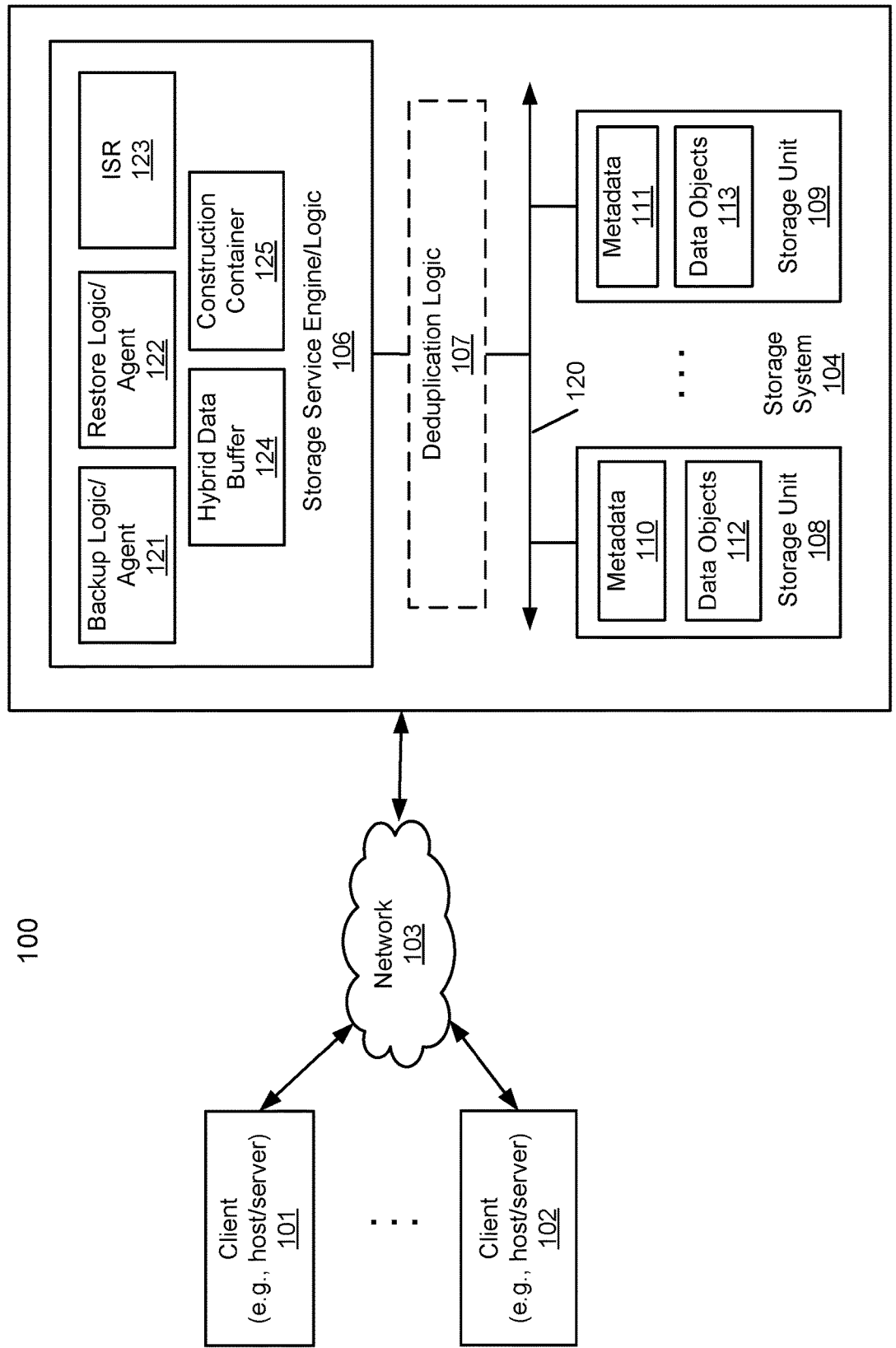
FIG. 1 is a block diagram illustrating a storage system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention describe how an interrupt service routine (ISR) probe approach is utilized to identify an abrupt abort during a restore operation and ensure a safe, uninterrupted restore operation from the aborted point in a next restore session. In one embodiment, a hybrid data buffer and an ISR are utilized to achieve such uninterrupted restore session, as described in more detail herein below.

Embodiments of the invention further disclose a solution to avoid an increase in the restore window due to an unexpected abort. The solution also ensures an uninterrupted restore service after an unintended termination of the restore operation to prevent corrupted production data.

According to one aspect, a method for restoring data is described. The method, in response to receiving a first restore request, initiates a second restore request to a hybrid data buffer to route blocks of backup data to the hybrid data buffer. The method further invokes an interrupt service routine (ISR) that is initialized with reserved addresses. When the blocks of backup data are transmitted to the hybrid data buffer, the method further tags, by the ISR, the blocks of backup data to a specified location, where the specified location is one of the reserved addresses. When an abort of a restore operation occurs, the method may mask the ISR and freeze the hybrid data buffer. During a next restore session, the method may unmask the ISR and check the hybrid data buffer for filled reserved addresses. If there are empty addresses in the hybrid data buffer, the method may route blocks of backup data corresponding to the empty addresses to a construction container. In one embodiment, the reserved addresses are reserved addresses in the construction container. In one embodiment, the hybrid data buffer includes a read-ahead buffer and an operational buffer, and the blocks of backup data are transmitted to the read-ahead buffer. In one embodiment, the ISR holds a state of the read-ahead buffer. The method may monitor states of the reserved addresses, and route the reserved addresses to the ISR to track each of the blocks of backup data being read or retrieved from a target device. When the abort occurs, the method may freeze states of the reserved addresses and terminate the restore operation. The method may be repeated until all of the blocks of backup data corresponding to the empty addresses are successfully read and routed onto the construction container.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic or agent 121 is configured to receive and back up or replicate data from a client (e.g., clients 101-102) and to store the backup data in any one or more of storage units 108-109. Restore logic or agent 122 is configured to retrieve and restore backup data from any one or more of storage units 108-109 back to a client (e.g., clients 101-102).

In one embodiment, restore agent 122 receives a restore request from clients 101-102. In response to the restore request, restore agent 122 may invoke an interrupt service routine (ISR) 123. ISR 123 may serve to indicate a predetermined location on construction container 125 where restore backup data are stored. Concurrently or subsequently, restore agent 122 may initiate a restore request to a hybrid data buffer 124. Hybrid data buffer 124 may include a combination of a read-ahead buffer and an operational buffer. Storage units 108-109 may route the backup data (i.e., data to be restored) to the hybrid data buffer 124. The read-ahead buffer may hold blocks of the restore backup data routed to a predetermined location on container 125 (as indicated by ISR 123). Construction container 125 (e.g., conditional construction container (CCC)) may receive the restore backup data from restore agent 122 and reconstruct the data blocks until the reconstruction is completed.

In some embodiments, during an abort of a restore operation, the read-ahead buffer may freeze and block details are captured. The block details, for example, may include block byte addresses of the blocks of data in the buffer, a stage (or an instance) where the abort occurred, a state of the blocks of data (e.g., whether a particular block of data was read or whether the block of data was ready for a write operation to a next stage), a masked ISR associated with a particular block's details, and parent ISR details). When the abort occurs, ISR 123 is immediately masked. On a next restore operation, ISR 123 may be invoked and unmasked by restore agent 122. In one embodiment, ISR 123 may start reading the read-ahead buffer and the blocks of data may be routed for restore to the container 125.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In response to a data file to be stored in storage units 108-109, according to one embodiment, deduplication logic 107 is configured to segment the data file into multiple segments (also referred to as chunks), for example as data objects 112-113, according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

Figure 2C:
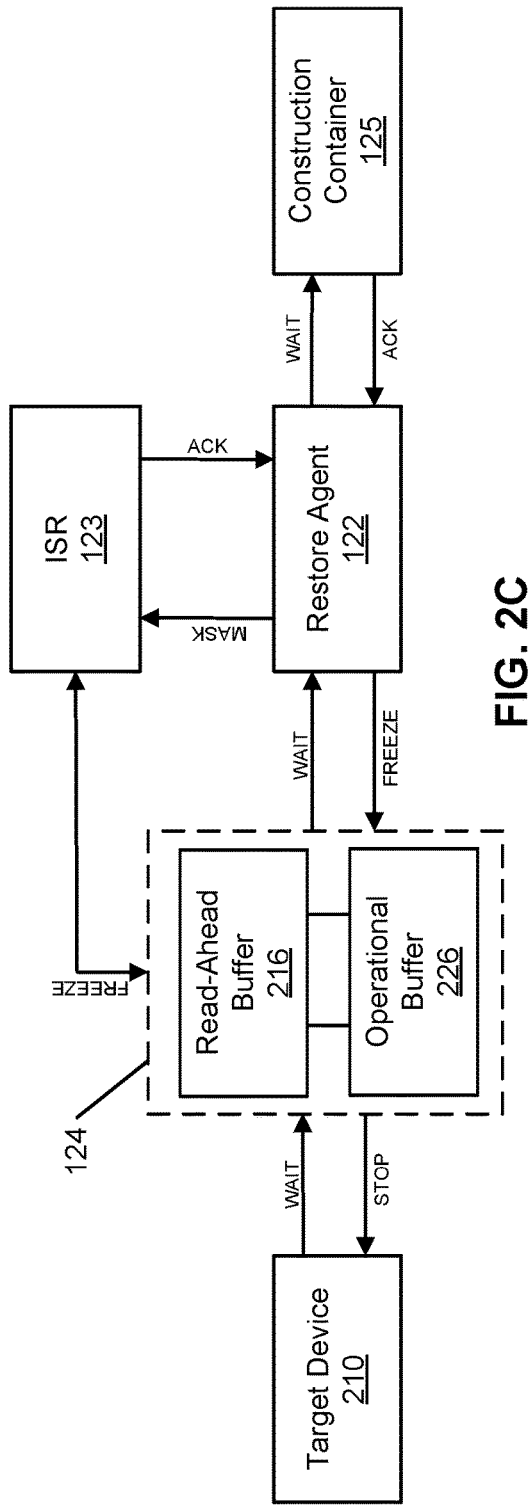

FIGS. 2A-2D are block diagrams illustrating a restore operation according to one embodiment. Referring to FIG. 2A, restore agent 122 may initiate a restore request to hybrid data buffer 124, which may include a read-ahead buffer 216 and an operational buffer 226. The read-ahead buffer 216 may hold blocks of data read or retrieved from target device 210 (e.g., storage units 108-109). The operational buffer 226 may initiate a read or retrieve request to target device 210 in order to obtain the blocks of data to be restored. Buffer 226 may route the blocks of data to a predetermined location on container 125 (e.g., conditional construction container (CCC)), as indicated by ISR 123. Concurrently or subsequently, restore agent 122 may invoke ISR 123 that is initialized with reserved addresses from construction container 125 through restore agent 122. ISR 123 may also hold the state of the hybrid data buffer 124. For example, the state of the buffer 124 may indicate whether buffer 124 include data or not. If there are data in buffer 124, the state of the buffer 124 may further indicate the number of blocks of data in buffer 124 and which blocks correspond to the ISRs allocated for masking in the case of an abort. In the operations, as illustrated in FIGS. 2A-2D, the state of the buffer 124 may include a READY state, a READ state, a WRITE state, a WAIT state, etc.

Referring now to FIG. 2B, once target device 210 starts to transmit the blocks of data to be restored to hybrid data buffer 124 (i.e., read-ahead buffer 216), the ISR 123 may tag the blocks of data to a specified location (or reserved address) on the container 125. The blocks of data may be transmitted to the same reserved address in the container 125. The states of the reserved addresses (e.g., empty or full) may be monitored by restore agent 122 and routed to ISR 123 to track each block of data being read from the target device 210. As an example, if a reserved address is full, restore agent 122 may determine the header, tail, and payload of the existing data stored at the reserved address to ensure the integrity of the data since there is a movement of bytes across the various modules (e.g., target device 210, restore agent 122, ISR 123, buffer 124, container 125, etc.) in the restore operation.

Referring now to FIG. 2C, if an abort occurs, ISR 123 may be masked and hybrid data buffer 124 may be frozen by restore agent 122. Restore agent 122 may also freeze the states of addresses reserved on the container 125 and terminate the restore job.

Figure 2D:
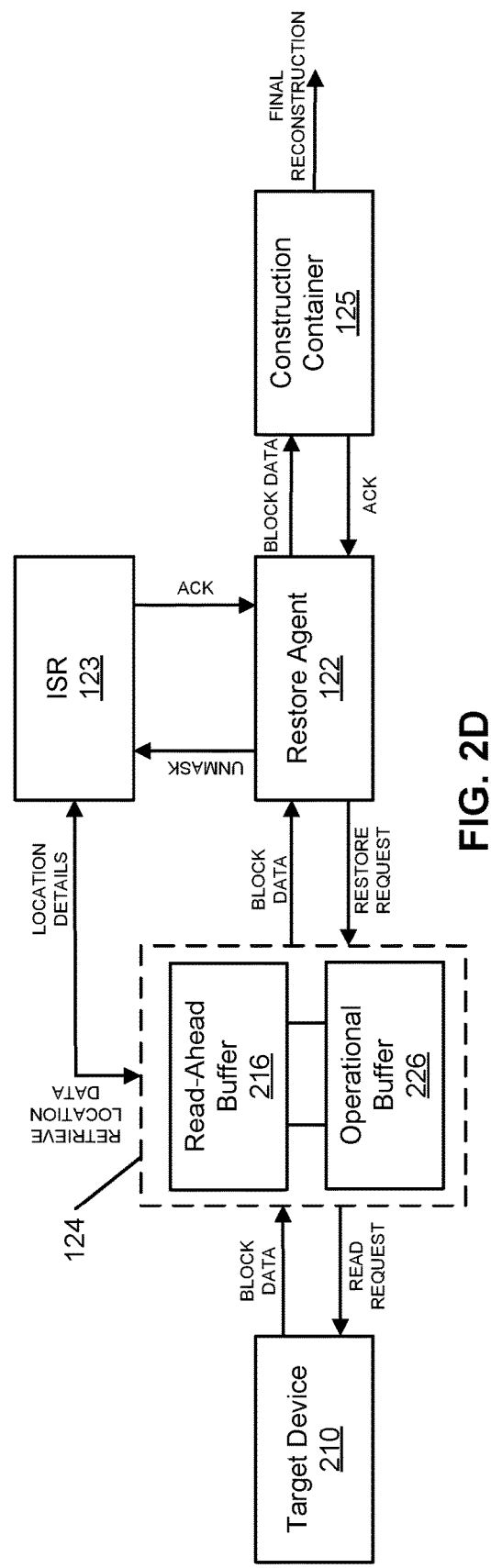

Referring now to FIG. 2D, in a next restore session, restore agent 122 may unmask ISR 123. The hybrid data buffer 124 may be checked for the reserved and filled addresses from restore agent 122. In case some addresses are empty, the corresponding blocks of data may begin to route, in accordance with a restore protocol, to container 125. This process repeats until all of the blocks of data has been successfully read and routed onto the container 125 for final reconstruction.

Figure 3:
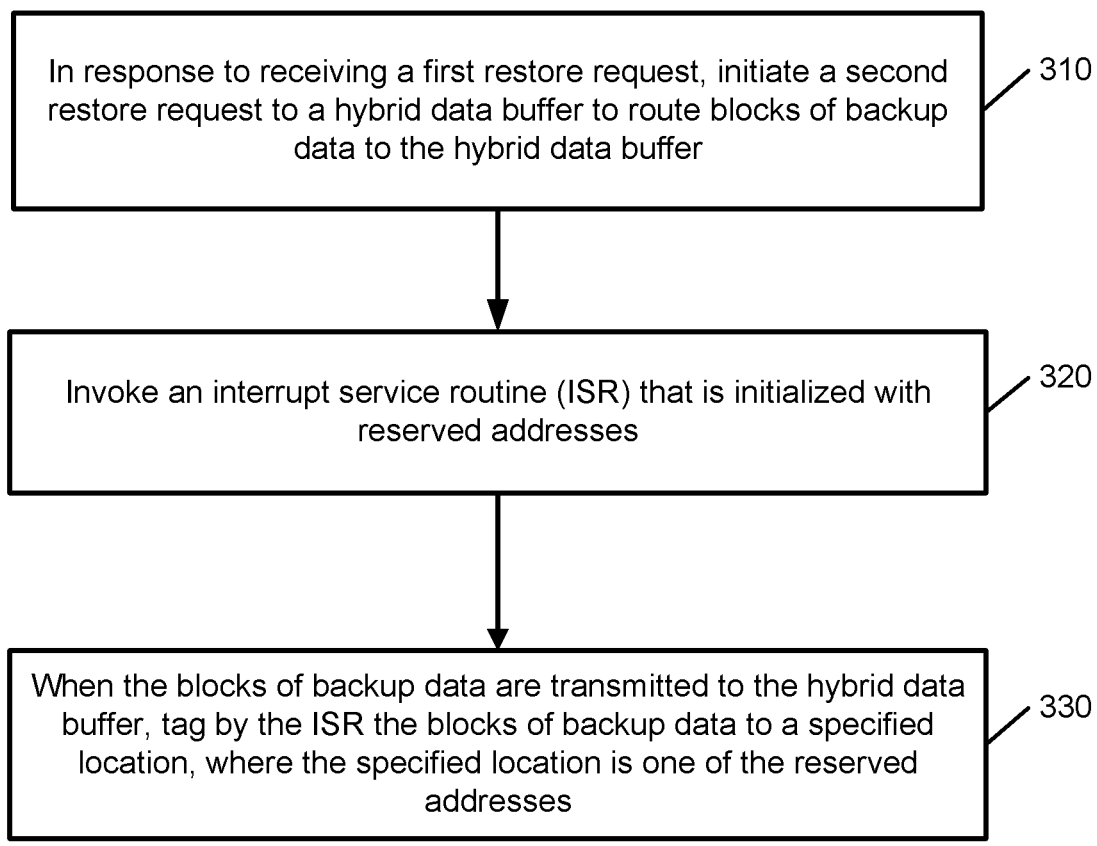
FIG. 3 is a flow diagram illustrating a method for restoring data according to one embodiment.

FIG. 3 is a flow diagram illustrating a method for restoring data according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by restore agent 122 and/or ISR 123 of FIG. 1.

Referring to FIG. 3, at block 310, in response to receiving a first restore request (e.g., from clients 101-102 of FIG. 1), the processing logic initiates a second restore request to a hybrid data buffer (e.g., hybrid data buffer 124) to route blocks of backup data to the hybrid data buffer. At block 320, the processing logic invokes an ISR that is initialized with reserved addresses (e.g., reserved addresses in construction container 125). At block 330, when the blocks of backup data are transmitted to the hybrid data buffer, the processing logic tags, by the ISR, the blocks of backup data to a specified location, where the specified location is one of the reserved addresses.

Note that some or all of the components as shown and described above (e.g., backup agent 121, restore agent 122, ISR 123, hybrid data buffer 124, and construction container 125 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
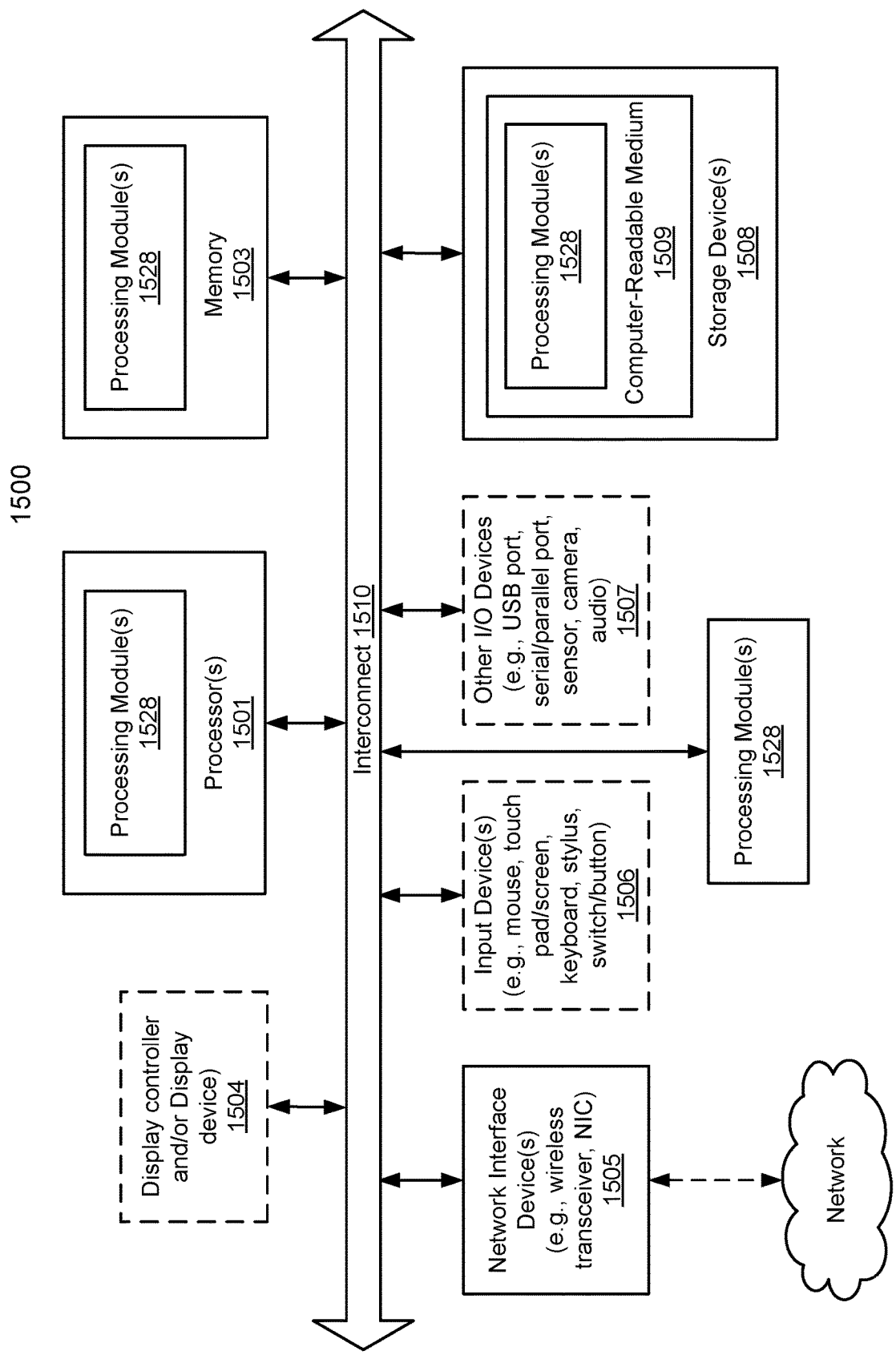
FIG. 4 is a block diagram illustrating a data processing system according to one embodiment.

FIG. 4 is a block diagram illustrating an example of a data processing system which may be used with one embodiment. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, modules 121-125 as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for restoring backup data in a data deduplication system, the method comprising:
   initiating a restore request to a hybrid data buffer to route blocks of backup data to the hybrid data buffer;
   invoking an interrupt service routine (ISR) that is initialized with reserved addresses in a construction container;
   in response to determining that the blocks of backup data are transmitted to the hybrid data buffer, tagging, by the ISR, the blocks of backup data to a specified location, the specified location being one of the reserved addresses in the construction container;
   in response to determining that an abort of a restore operation occurs, masking the ISR and freezing the hybrid data buffer;
   during a next restore session, unmasking the ISR and checking the hybrid data buffer for the reserved addresses; and
   in response to determining that there are empty addresses among the reserved addresses, routing blocks of backup data corresponding to the empty addresses to the construction container.

2. The method of claim 1, wherein
   the hybrid data buffer includes a read-ahead buffer and an operational buffer, and
   the blocks of backup data are transmitted to the read-ahead buffer.

3. The method of claim 1, further comprising:
   monitoring states of the reserved addresses; and
   routing the states of the reserved addresses to the ISR to track each of the blocks of backup data being read or retrieved from a target device.

4. The method of claim 1, further comprising: in response to determining that the abort of the restore operation occurs, freezing states of the reserved addresses and terminating the restore operation.

5. The method of claim 1, wherein the method is repeated until all of the blocks of backup data corresponding to the empty addresses are successfully read and routed onto the construction container.

6. The method of claim 2, wherein the ISR holds a state of the read-ahead buffer.

7. A non-transitory machine-readable medium having instructions stored therein, which when executed by a processor, cause the processor to perform operations, the operations comprising:
   initiating a restore request to a hybrid data buffer to route blocks of backup data to the hybrid data buffer;
   invoking an interrupt service routine (ISR) that is initialized with reserved addresses in a construction container;
   in response to determining that the blocks of backup data are transmitted to the hybrid data buffer, tagging, by the ISR, the blocks of backup data to a specified location, the specified location being one of the reserved addresses in the construction container;
   in response to determining that an abort of a restore operation occurs, masking the ISR and freezing the hybrid data buffer;
   during a next restore session, unmasking the ISR and checking the hybrid data buffer for the reserved addresses; and
   in response to determining that there are empty addresses among the reserved addresses, routing blocks of backup data corresponding to the empty addresses to the construction container.

8. The non-transitory machine-readable medium of claim 7, wherein
   the hybrid data buffer includes a read-ahead buffer and an operational buffer, and
   the blocks of backup data are transmitted to the read-ahead buffer.

9. The non-transitory machine-readable medium of claim 7, wherein the operations further comprise:
   monitoring states of the reserved addresses; and
   routing the states of the reserved addresses to the ISR to track each of the blocks of backup data being read or retrieved from a target device.

10. The non-transitory machine-readable medium of claim 7, wherein the operations further comprise: in response to determining that the abort of the restore operation occurs, freezing states of the reserved addresses and terminating the restore operation.

11. The non-transitory machine-readable medium of claim 7, wherein the operations are repeated until all of the blocks of backup data corresponding to the empty addresses are successfully read and routed onto the construction container.

12. The non-transitory machine-readable medium of claim 8, wherein the ISR holds a state of the read-ahead buffer.

13. A data processing system, comprising:
   a processor; and
   a memory coupled to the processor to store instructions, which when executed by the processor, cause the processor to perform operations, the operations comprising:
   initiating a restore request to a hybrid data buffer to route blocks of backup data to the hybrid data buffer;

invoking an interrupt service routine (ISR) that is initialized with reserved addresses in a construction container;

in response to determining that the blocks of backup data are transmitted to the hybrid data buffer, tagging, by the ISR, the blocks of backup data to a specified location, the specified location being one of the reserved addresses in the construction container;

in response to determining that an abort of a restore operation occurs, masking the ISR and freezing the hybrid data buffer;

during a next restore session, unmasking the ISR and checking the hybrid data buffer for the reserved addresses; and in response to determining that there are empty addresses among the reserved addresses, routing blocks of backup data corresponding to the empty addresses to the construction container.

14. The data processing system of claim 13, wherein the hybrid data buffer includes a read-ahead buffer and an operational buffer, and the blocks of backup data are transmitted to the read-ahead buffer.

15. The data processing system of claim 13, wherein the operations further comprise:

monitoring states of the reserved addresses; and routing the states of the reserved addresses to the ISR to track each of the blocks of backup data being read or retrieved from a target device.

16. The data processing system of claim 13, wherein the operations further comprise: in response to determining that the abort of the restore operation occurs, freezing states of the reserved addresses and terminating the restore operation.

17. The data processing system of claim 13, wherein the operations are repeated until all of the blocks of backup data corresponding to the empty addresses are successfully read and routed to the construction container.

18. The data processing system of claim 14, wherein the ISR holds a state of the read-ahead buffer.

* * * * *